(12) United States Patent
Liu

(10) Patent No.: US 6,775,435 B1
(45) Date of Patent: Aug. 10, 2004

(54) WAVELENGTH INTERLEAVER

(75) Inventor: Zhimin Liu, San Jose, CA (US)

(73) Assignee: Oplink Communications, Inc., San Jose, CA (US)

( * ) Notice: Subject to any disclaimer, the term of this patent is extended or adjusted under 35 U.S.C. 154(b) by 35 days.

(21) Appl. No.: 09/705,166

(22) Filed: Nov. 1, 2000

Related U.S. Application Data

(60) Provisional application No. 60/162,751, filed on Nov. 1, 1999.

(51) Int. Cl.$^7$ ................................................ G02B 6/32
(52) U.S. Cl. ........................................ 385/34; 385/31
(58) Field of Search .............................. 385/34, 39, 33, 385/9, 16, 17, 19

(56) References Cited

U.S. PATENT DOCUMENTS

| | | | | |
|---|---|---|---|---|
| 4,558,952 A | * | 12/1985 | Kulesh et al. | ............... 356/486 |
| 4,786,173 A | * | 11/1988 | Fournier et al. | ............. 356/460 |
| 5,113,282 A | * | 5/1992 | O'Meara et al. | ............... 349/17 |
| 5,274,381 A | * | 12/1993 | Riza | ........................... 342/368 |
| 5,307,073 A | * | 4/1994 | Riza | ........................... 342/368 |
| 5,719,704 A | * | 2/1998 | Shiraishi et al. | ............... 355/53 |
| 5,963,682 A | * | 10/1999 | Dorschner et al. | .......... 349/159 |
| 5,975,697 A | * | 11/1999 | Podoleanu et al. | ......... 351/206 |
| 6,303,900 B1 | * | 10/2001 | Tachikawa | ............... 219/121.7 |
| 6,339,474 B2 | * | 1/2002 | Paiam et al. | ................. 356/480 |
| 6,370,286 B1 | * | 4/2002 | Krol et al. | ..................... 385/11 |
| 6,415,073 B1 | * | 7/2002 | Cappiello et al. | ........... 359/124 |

* cited by examiner

Primary Examiner—Frank G. Font
Assistant Examiner—Kevin C Kianni
(74) Attorney, Agent, or Firm—Fish & Richardson P.C.

(57) ABSTRACT

This invention discloses an optical interleaver that includes a first collimating lens for collimating an input optical signal into collimated beams and a second collimating lens for focusing the collimated parallel beams into an output optical fiber. The interleaver further includes a phase delay difference generating means for generating a phase-delay difference between portions of the collimated parallel beams for generating an interference in the second collimating lens for selectively enhance signal transmission of certain wavelengths. In a preferred embodiment, the phase delay difference generating means comprising a glass plate blocking a portion of the collimated parallel beams for generating a phase delay for a portion of the collimated parallel beams passing therethrough. In another preferred embodiment, the phase delay difference generating means comprising a glass plate having an upper portion covering an upper portion of the collimated parallel beams. The glass plate having a lower portion covering a lower portion of the collimated parallel beams for generating a phase delay difference between the upper portion and lower portion of the collimated parallel beams. In another preferred embodiment, the interleaver further includes a control means for controlling the phase delay difference generating means for selectively generating signal transmission at different wavelengths according to the interference generated in the second collimating lens.

18 Claims, 1 Drawing Sheet

WAVELENGTH INTERLEAVER

This Formal Application claims a Priority Date of Nov. 1, 1999 benefited from a Provisional Application No. 60/162,751, filed by the same Applicant of this Application on Nov. 1, 1999.

FIELD OF THE INVENTION

The present invention relates generally to a signal transmission system implemented with optical fibers and related optical components. More particularly, this invention relates to an optical interleave device implemented in a dense wavelength division multiplexing (DWDM) system.

BACKGROUND OF THE INVENTION

As the optical wavelength division multiplexing (WDM) technology gradually becomes the standard backbone network for the fiber optic communication systems, a challenge is continuously faced by those of ordinary skill in the art to increase the transmission capacity due to the bandwidth limitations of the optical fiber signal transmission systems. Specifically, the bandwidth of the optical fiber amplifier, such as Erbium doped fiber amplifier (EDFA), is limited as more and more channels are inserted into the transmission band. The wavelength spacing between adjacent channels employed for carrying the optical signals becomes narrower when more channels are "squeezed in" the transmission band for the purpose of satisfying a requirement of increasing the transmitting capacity of the signal transmission system. However, the wavelength division multiplexing (WDM) technologies employing dielectric filters are confronted with a limitation due to the ability to separate one channel from adjacent ones when the channel spacing is further reduced with increased number of channels. Another technical approach applies a fiber grating technology for multiplexing and de-multiplexing the optical signals transmitted over optical fiber systems. However, the fiber grating technology is limited by the temperature sensitivity problems when the channel spacing becomes narrower.

As the fiber optical industry is now providing stable products for 200 GHz and 100 GHz channel spacing WDM signal transmission over the optical fiber systems, a new interleave technology emerges in attempt to further reduce the channel spacing to achieve higher bandwidth. An interleaver is an optical device employed to select wavelength channel according to predefined channel spacing. As an example, when optical signals of N channels with 50 GHz channel spacing are transmitted to an optical interleaver, the optical interleaver separates the optical signals into a first group of signals consisted of channels 1, 3, 5, . . . N−1, and a second group of signals consisted of channels of 2, 4, 6, . . . N, with channel spacing of 100 GHz. Therefore, fiber optical system implemented with an optical interleaver is capable to process optical signals transmitted with a narrow channel spacing by first separating the signals into groups of signals with broader channel spacing such that optical devices currently provided by the optical fiber industry can be applied to further process these optical signals outputted from the interleaver.

As the WDM technology now enables the utilization of substantially wider fiber bandwidth for signal transmission, a number of prior art patents disclosed methods and configurations deal with interleaver. The interleaver according to the state of the art are bulky, and having a high production cost due to the need of using more expensive materials and optical elements.

Therefore, a need still exists in the art of manufacturing and designing the fiber optic interleaver to provide simpler configurations that would reduce size and production cost.

SUMMARY OF THE PRESENT INVENTION

It is therefore an object of the present invention to provide a new design and configuration for manufacturing and assembling a fiber optic interleaver with reduced size to provide compact interleaver with lower the production.

Specifically, it is an object of the present invention to provide an interleaver implemented with new configuration by employing a phase delay generating means such as a glass plate to construct a type of Mach-Zender interferometer to induce an optical interference for enhancing signal transmission at certain wavelengths. The phase delay generating means such as a glass plate are positioned between a pair of collimator lenses for inducing interference between two portions of collimated beam transmitted with different phases. Lights with certain wavelength are transmitted and lights with other wavelengths are suppressed. Therefore, the phase delay generating means can be implemented to selectively enhance and suppress signal transmission with predefined wavelengths thus achieving the function as an interleaver.

Briefly, in a preferred embodiment, the present invention includes an optical interleaver that includes a first collimator lens for collimating an input optical signal into collimated beams and a second collimator lens for focusing the collimated beam into an output optical fiber. The interleaver further includes a phase delay generating means for generating a phase-delay between portions of the collimated beam for generating interference in the second collimator lens for selectively enhance signal transmission of certain wavelengths. In a preferred embodiment, the phase delay generating means comprising a glass plate blocking a portion of the collimated beam for generating a phase delay for a portion of the collimated beam passing through. In another preferred embodiment, the phase delay generating means comprising a glass plate having an upper portion covering an upper portion of the collimated beam. The glass plate having a lower portion covering a lower portion of the collimated beam for generating a phase delay between the upper portion and lower portion of the collimated beam. In another preferred embodiment, the interleaver further includes a control means for controlling the phase delay generating means for selectively generating signal transmission at different wavelengths according to the interference generated in the second collimator lens. In yet another preferred embodiment, the phase delay generating means comprising a glass plate having a plurality of predefined segments. Each segment has different combination of plate-thickness and diffraction index wherein the phase delay generating means is controlled by the control means for selectively generating signal transmission at different wavelengths with a predefined program. In another preferred embodiment, the phase delay generating means comprising a set of cascaded interferometer for making top flat profile of the transmissions band. In another preferred embodiment, each of the a set of cascaded interferometer comprising a phase delay plate and a half-pitch GRIN lens. In another preferred embodiment, each of the a set of cascaded interferometer comprising a phase delay plate and a pair of focus and collimating lenses. In another preferred embodiment, the interleaver further includes a reflective means for reflecting a portion of the collimated beam as second beam transmitted along a second optical path away from the collimated beam. The interleaver further includes a third collimator lens for focusing the second group of beam into a second output optical fiber. And, the interleaver further includes a second phase delay generating means for generating a second phase-delay between portions of the second beam. Thus an interference in the third collimator lens is generated for selectively enhance signal transmission of a second set of wavelengths outputting from the second optical fiber.

In summary, this invention discloses an optical interleaver that includes a phase delay generating means for generating a phase delay between different portions of optical beam for selectively enhancing signal transmissions at certain wavelengths resulting from interference between the different portions of optical beam. In a preferred embodiment, the interleaver further includes a control means for controlling the phase delay generating means controlling a selection of certain wavelengths for enhanced signal transmission. In another preferred embodiment, the phase delay generating means further comprising an optical element for transmitting optical beam through. In another preferred embodiment, the phase difference generating means further comprising the optical element for transmitting optical beam through with at least two portions of different thickness. In another preferred embodiment, the phase delay generating means further comprising the optical element for transmitting optical beams through with at least two portions of different diffraction indexes.

These and other objects and advantages of the present invention will no doubt become obvious to those of ordinary skill in the art after having read the following detailed description of the preferred embodiment, which is illustrated in the various drawing figures.

DETAILED DESCRIPTION OF THE INVENTION

Figure 1A:
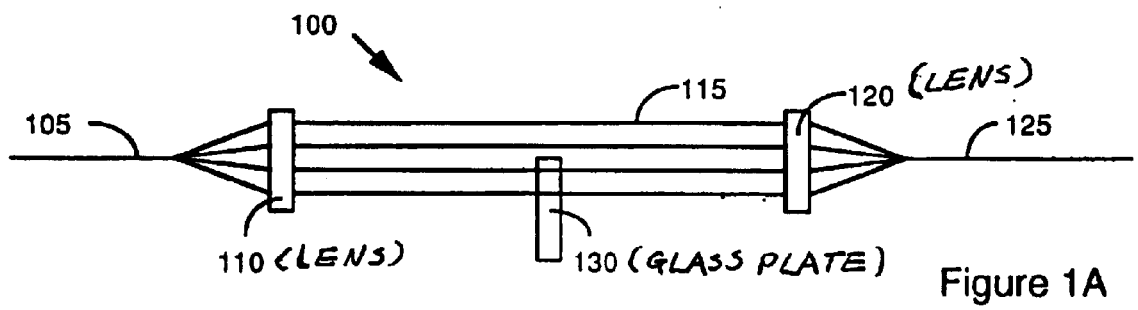
FIG. 1A is a cross sectional view of a collimator with a glass plate blocks one portion of the collimated beam to provide a phase delay according to this invention.

Referring to FIG. 1 for a cross sectional view of an interleaver 100 manufactured with a new configuration of this invention. The interleaver 100 includes a first collimator lens 110 to receive input optical signals transmitted from an input optical fiber 105. The first collimator lens 110 collimates the input optical signals into collimated light beam 115. The beam projects to a second collimator lens 120. The second collimator lens 120 then focuses the light beam onto an output optical fiber 125. The interleaver 100 further includes a glass plate 130 blocks a lower half portion of the beam 115. The glass plate provides a special optical characteristic to add a phase delay for the portion of the beam 115 passing through the plate. Therefore, as a result of passing through the glass plate 130, the portion of the beam 115 that passes through the glass plate 130 are transmitted to the second collimator lens 120 with a phase delay. An optical interference occurs between the lower portion with a phase delay and the higher portion of the beams 115 without a phase delay. As a result of the interference, the lights having a wavelength satisfying a condition of:

$$(n-1)t=m\lambda \quad (1)$$

are enhanced. The symbol $\lambda$ represents the wavelength, m represents a positive integer, t is the thickness of the glass plate 130 and n is the diffraction index of the glass plate 130. As a result of the interference between these two portions of beams in the collimator lens 120, the lights with wavelength that do not satisfy the condition of Equation (1) are suppressed. By carefully controlling the thickness t of the glass plate, the interleaver 100 can be applied to select a series of wavelengths with selected wavelength spacing for a WDM signal transmission system. For instance, by making the glass plate as a circular plate and having different thickness along different radial angles, the circular glass plate 130 can be rotated. Different portions of the circular plate 130 are controlled to rotate for blocking the portion of beam 115 thus generating optical signals of different wavelengths according to the condition of Equation (1) with specific thickness t.

Figure 1B:
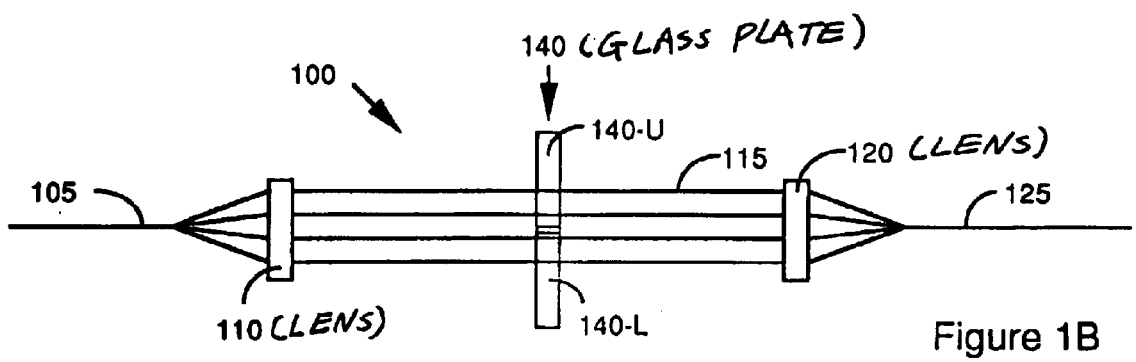
FIG. 1B is a cross sectional view of a collimator with a combined glass plate to provide a phase delay.

FIG. 1B is an alternate preferred embodiment of FIG. 1A with a glass plate 140 to cover the entire optical path thus covering the upper and lower portions of the beam 115. The glass plate 140 has an upper portion 140-U and a lower portion 140-L, with these two portions with two different thicknesses or two different diffraction indexes. Thus a phase difference is generated between the beams after passing through the glass plate. Again, interference occurs between these two portions of beams and wavelength that satisfies the condition of Equation (1) is enhanced, otherwise, the optical transmission is suppressed. The glass plate 140 can be employed for controlling and selecting different wavelength for signal transmission by controlling the thickness and material index.

Figure 2:
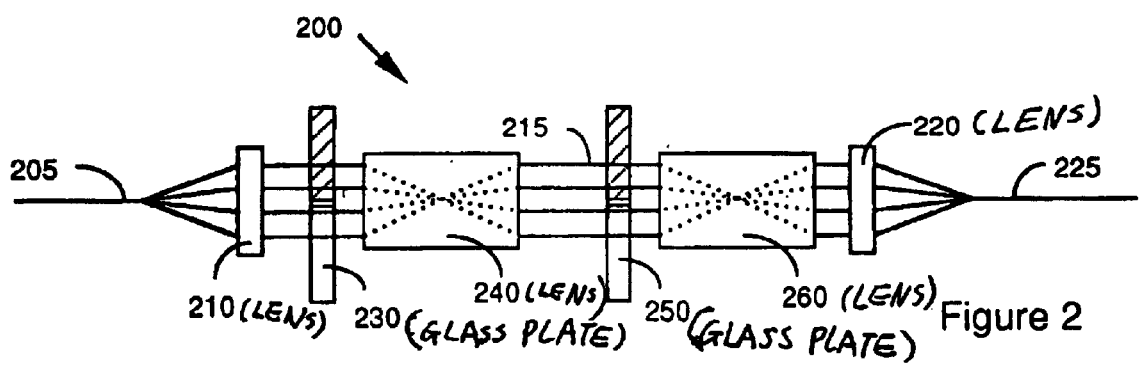
FIG. 2 is a cross sectional view for showing a configuration of a multiple step interleaver.

Referring to FIG. 2 for another preferred embodiment of an interleaver 200 of this invention. The interleaver 200 includes a first collimator lens 210 to receive input optical signals transmitted from an input optical fiber 205. The first collimator lens 210 collimates the input optical signals into collimated beam 215. The light beam projects to a second collimator lens 220. The second collimator lens 220 then focuses the light beam onto an output optical fiber 225. The interleaver 200 further includes cascaded interferometers interposed between the first collimator lens 210 and the second collimator lens 220. The interferometer includes a phase delay glass plate 230 and 250 followed by half pitch GRIN lens 240 and 260 for focusing a collimated beam inside the GRIN lens and then re-collimates the beam again into collimated beam. The phase delay plate 230 divide the beam into two portions with a phase difference between these two portions of beam. With the phase difference, these two groups of beams interfere with each other in passing through the half pitch GRIN lenses 240 and re-collimated by lens 240 again. Plate 250 divides the beam into two equal or different portions again and provide phase delay for the portion, the two portions of light interference in DRIN lens 260 again. The interference beam gets re-collimated by GRIN lens 260 again and received by collimator 220. The second phase delay provided by the plate 250 is different from the phase delay provided by plate 230 to make top flat profile of transmitting band. Several interferometer can be cascaded as shown to provide top-flat wavelength pass band interleaver 200 as often required in a wavelength division multiplexing (WDM) system. Instead of the half-pitch GRIN lenses 240 and 260, a pair of focus/collimate convention lenses can be used to replace the GRIN lenses 240 and 260 as that shown in FIG. 2.

Figure 3:
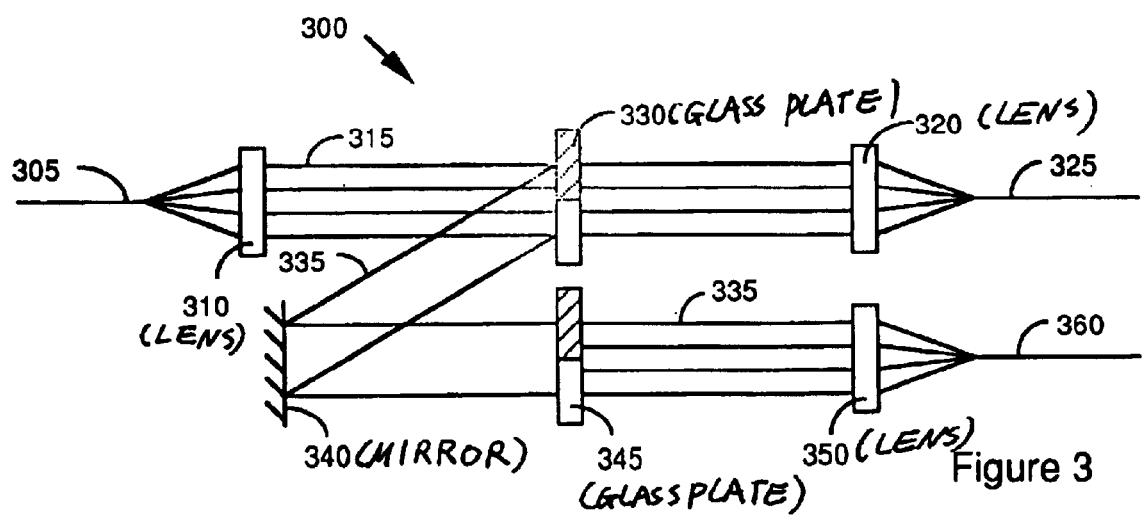
FIG. 3 is a cross sectional view of interleaver of this invention with two output fibers.

Referring to FIG. 3 for another preferred embodiment of an interleaver 300 of this invention. The interleaver 300 includes a first collimator lens 310 to receive input optical signals transmitted from an input optical fiber 305. The first collimator lens 310 collimates the input optical signals into collimated light beam 315. The light beam project to a second collimator lens 320. The second collimator lens 320 then focuses the light beam onto an output optical fiber 325. The interleaver 300 further includes a phase delay glass plate 330 to generate a phase delay difference between two portions of the beam 315. Therefore, as a result of passing through the glass plate 330, two portion of parallel beams with phase delay difference are projected to the second collimator lens 320 to interfere with each other. Optical signals with specific wavelengths satisfying Equation (1) are enhanced and transmitted from the first optical fiber 325.

The first phase delay glass plate 330 further includes a partially reflective front surface for reflecting a portion of the collimated beam 315 to a mirror 340 disposed away from the optical path of the beam 315. The mirror 340 reflects the beam 335 to a second collimator lens 350 for transmitting a output signal from a second output optical fiber 360. A second phase delay glass plate 345 is placed between the mirror 340 and the second collimating lens 350 to add a phase delay difference between different portion of the beam 335. As discussed above, the portions of beams that have a phase difference will again interfere with each other according to Equation (1) to generated optical signals with wavelengths that are enhanced or suppressed. Optical signals with selected wavelengths are then selected by using particular designed phase delay phase plates 330 and 345. The first and second phase delay glass plates 330 and 340 can be arranged to select a group of wavelength represented by $\lambda 1, \lambda 3, \lambda 5, \ldots, \lambda n-1$, and $\lambda 2, \lambda 4, \lambda 6, \ldots, \lambda n$ respectively for an incoming WDM optical signals represented by $\lambda 1, \lambda 2, \lambda 3, \lambda 4 \ldots \lambda n-1, \lambda n$. Alternatively, a 1×2 optical coupler can be placed before the device to provide such separation as well.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

I claim:

1. An optical interleaver comprising:
   a first collimating lens for collimating an input optical signal into collimated beams, the input optical signal including more than one wavelength, and a second collimating lens for focusing said collimated beams into an output optical fiber; and
   a phase delay generating means partially interposed between said first and said second collimating lens such that only a portion of said collimated beams pass through said phase delay generating means, said phase delay generating means to delay a phase of at least one wavelength of an optical signal present in said input optical signal a said second collimating lens focusing said collimated beams to a point where, the at least one wavelength is suppressed while other wavelengths are transmitted through the output optical fiber.

2. The optical interleaver of claim 1 wherein:
   said phase delay difference generating means comprising a glass plate blocking a portion of said collimated beams for generating a phase delay for a portion of said collimated parallel beams passing therethrough.

3. The optical interleaver of claim 1 wherein:
   said phase delay difference generating means comprising a glass plate having an upper portion covering an upper portion of said collimated beams and said glass plate having a lower portion covering a lower portion of said collimated beams for generating a phase delay difference between said upper portion and lower portion of said collimated beams.

4. The optical interleaver of claim 1 further comprising:
   a control means for controlling said phase delay difference generating means for selectively generating signal transmission at different wavelengths according to said interference generated in said second collimating lens.

5. The optical interleaver of claim 4 further comprising:
   said phase delay difference generating means comprising a glass plate having a plurality predefined segments with different combination of plate-thickness and diffraction index wherein said phase delay difference generating means is controlled by said control means for selectively generating signal transmission at different wavelengths with a predefined program.

6. The optical interleaver of claim 1 wherein:
   said phase delay difference generating means comprising a set of cascaded Mach-Zender interferometer for generating a series of band-pass signal transmissions.

7. The optical interleaver of claim 6 wherein:
   each of said a set of cascaded Mach-Zender interferometer comprising a phase delay plate and a half-pitch GRIN lens.

8. The optical interleaver of claim 6 wherein:
   each of said a set of cascaded Mach-Zender interferometer comprising a phase delay plate and a pair of focus and collimating lenses.

9. The optical interleaver of claim 1 further comprising:
   a reflective means for reflecting a portion of said collimated beams as second group of parallel beams transmitted along a second optical path away from said collimated beams;
   a third collimating lens for focusing said second group of parallel beams into a second output optical fiber; and
   a second phase delay difference generating means for generating a second phase-delay difference between portions of said second group of parallel beams for generating an interference in said third collimating lens for selectively enhancing signal transmission of a second set of wavelengths outputting from said second optical fiber.

10. The optical interleaver of claim 9 wherein:
    said reflective means comprising a partially reflective front surface of said phase delay means and a mirror for reflecting a portion of said collimated beams as second group of parallel beams transmitted along a second optical path away from said collimated beams.

11. The optical interleaver of claim 1 further comprising:
    a control means for controlling said phase difference generating means controlling a selection of certain wavelengths for enhanced signal transmission.

12. The optical interleaver of claim 1 wherein:
    said phase difference generating means further comprising an optical element for transmitting optical beams therethrough.

13. The optical interleaver of claim 12 wherein:
    said phase difference generating means further comprising said optical element for transmitting optical beams therethrough with at least two portions of different thicknesses.

14. The optical interleaver of claim 12 wherein:

said phase difference generating means further comprising said optical element for transmitting optical beams therethrough with at least two portions of different diffraction indexes.

15. A method of interleaving an optical signal comprising:

receiving an input optical signal, the input optical signal including more than one wavelength;

collimating the input optical signal into collimated beams;

phase delaying a portion of the collimated beams, the collimated beams divided into a delayed portion and a non-delayed portion; and focusing both the delayed portion and the non-delayed portion of the collimated beams such that at least one wavelength is suppressed while other wavelengths are transmitted.

16. The method of claim 15 further comprising:

controlling a selection of certain wavelengths for enhanced signal transmission.

17. The method of claim 15 further comprising:

phase delaying a first portion of the collimated beams by a first amount; and phase delaying a second portion of the collimated beams by a second amount.

18. The method of claim 15 further comprising:

phase delaying a plurality of portions of the collimated beams, each portion of the collimated beams phase delayed by a different amount.

* * * * *